United States Patent [19]
Balderson et al.

[11] Patent Number: 5,902,842
[45] Date of Patent: May 11, 1999

[54] TEMPERATURE SENSITIVE MATERIAL

[75] Inventors: Simon Neville Balderson, Telford; Robert John Whitwood, Stafford, both of United Kingdom

[73] Assignee: Sealed Air (NZ) Limited, Hamilton, New Zealand

[21] Appl. No.: 08/809,610

[22] PCT Filed: Aug. 8, 1995

[86] PCT No.: PCT/IB95/00624
§ 371 Date: Mar. 25, 1997
§ 102(e) Date: Mar. 25, 1997

[87] PCT Pub. No.: WO96/05490
PCT Pub. Date: Feb. 22, 1996

[30] Foreign Application Priority Data

Aug. 9, 1994 [GB] United Kingdom .................. 9416033

[51] Int. Cl.⁶ ...................................................... C08J 3/00
[52] U.S. Cl. ............................................................. 523/337
[58] Field of Search ............................................. 523/337

[56] References Cited

U.S. PATENT DOCUMENTS 2,971,852  2/1961  Schulein ..................................... 99/192

OTHER PUBLICATIONS

Patent Abstracts of Japan, vol. 8, No. 109 (P–275) [1546], May 22, 1984 & JP,A,59 017121 (KAO Sekken KK), Jan. 28, 1984.

Patent Abstracts of Japan, vol. 006, No. 104 (P–122), Jun. 15, 1982 & JP,A,57 037227 (Green Cross Corp:The), Mar. 1, 1982.

Patent Abstracts of Japan, vol. 006, No. 104 (P–122) [982], Jun. 15, 1982 & JP,A,57 037228 (Green Cross Corp:The), Mar. 1, 1982.

Database WPI, Week 7820, Derwent Publications Ltd., London, GB; AN 78–35699 & JP,A,53 037 479 (Dainippon Printing KK), Apr. 6, 1978.

*Primary Examiner*—Edward J. Cain

[57] ABSTRACT

A temperature sensitive material and method of preparing the same includes an oil-in-water emulsion in which the emulsifier type and content are controlled, as are the freezing point of the oil phase, the freezing point of the water phase, the oil-to-water ratio and the particle size of the oil phase and to which additives are introduced in the water phase, selected from the group consisting of a salt, glycerol and urea such that the material undergoes an irreversible optical change when subjected to a temperature above the reveal temperature of the emulsion.

10 Claims, No Drawings

TEMPERATURE SENSITIVE MATERIAL

This invention relates to a method of preparing a temperature sensitive material and to a temperature sensitive material prepared by the method.

In U.S. Pat. No. 2,971,852 there is disclosed a temperature telltale including a temperature sensitive material which may comprise an oil-in-water emulsion the freezing point of which, it is stated, may be easily adjusted by the addition of freezing point depressants, such as salt, sugar and glycerol. It is assumed that there is a single freezing temperature for the emulsion; that the freezing temperature and thawing temperature are the same; and that the freezing/thawing temperature can be controlled by addition of additives to the emulsion.

We have discovered that with oil-in-water emulsions there is no single "freezing" and "thawing" temperature but that there is an "activation temperature" below which the material must be cooled if it is to undergo a substantial visual change on subsequent heating and that there is a "reveal temperature" at which the material undergoes an irreversible optical change on reheating after having been cooled below the activation temperature. We have also discovered that the activation temperature and the reveal temperature for an oil-in-water emulsion can be different one from another and can be controlled independently one from another. We have further discovered how to control both the activation and reveal temperatures by using a range of additives both to the oil and water phase of the emulsion and using other compositional, preparation and material parameters.

In this manner, independently controlling both the activation temperature and reveal temperature provides for manufacture of a temperature sensitive material which is suitable for use in temperature indicators for use in a wider range of applications than hitherto.

According to the present invention there is provided a method of preparing a temperature sensitive material comprising an oil-in-water emulsion the method including controlling emulsifier type and content; the freezing point of the oil phase; the freezing point of the water phase; the oil-to-water ratio; and the particle size of the oil phase of the material so as to determine, in use, activation and reveal temperatures of the material.

Also according to the present invention, there is provided a temperature sensitive material prepared in accordance with the method.

The invention thus provides for independently controlling both the activation and the reveal temperatures so that a temperature indicator embodying the material can be rendered suitable for a wide range of applications.

Following is a series of Tables indicating a range of factors that control activation and reveal temperatures of a material in accordance with the present invention.

Referring now to Table 1 below there is shown the relationship between the concentration of emulsifier in the material and the activation temperature. In this example the emulsifier is in the form of sodium alkyl ether sulphate and the oil is paraffin oil. The oil-to-water ratio is 4:1.

TABLE 1

Effect of emulsifier content on activation temperature.

| Concentration of Emulsifier (pph/Parts per hundred of the total emulsion) | Activation Temperature (° C.) |
|---|---|
| 4.0 | −20.0 |
| 1.0 | −13.5 |
| 0.5 | −11.0 |

The Table indicates that change of the activation temperature is inversely proportional to concentration of the emulsifier. The concentration of emulsifier does not affect the reveal temperature to any significant extent.

The reveal temperature is considerably affected by the freezing point of the water phase of the emulsion and can thus be controlled by the addition of freezing point depressants to the water phase.

Referring now to Table 2 below there is shown the relationship between concentration of salt added to the water phase of the emulsion and the reveal temperature. In this example the emulsifier content is 0.15 pph of the total emulsion.

TABLE 2

Effect of addition of salt on the reveal temperature.

| Salt content (pph of the water phase) | Reveal temperature (° C.) |
|---|---|
| 8.0 | −8.0 |
| 6.0 | −4.0 |
| 4.0 | −3.0 |
| 2.0 | −2.0 |
| 0.0 | 0.0 |

The Table indicates that the reveal temperature can be lowered by progressively increasing the concentration of salt in the water phase.

It will be appreciated that freezing point depressants other than salt, such as glycerol and urea, may be used instead of salt.

It will also be appreciated that the freezing point of the water phase is not the same as the freezing point of the emulsion. Cooling the emulsion to the freezing point of the water phase will not cause subsequent collapse of the emulsion on reheating unless the freezing point of the oil phase has also been achieved. If the freezing point of the oil phase is lower than that of the water phase then it is the freezing point of the oil phase which dictates the activation temperature of the emulsion.

Therefore, if the freezing point of the oil phase is lower than the freezing point of the water phase, the activation temperature of the emulsion can be controlled by selection of the oil phase. A range of emulsions with increasing activation temperatures can be prepared for example by using paraffin oil, rape seed oil, sunflower oil and olive oil. Further control of the activation temperature can be achieved by mixing oils or by addition of other materials to the oils to control the freezing point.

Referring now to Table 3 below there is shown the relationship between the oil to water ratio and the activation and reveal temperatures. In this example the concentration of emulsifier is 0.5 pph of the emulsion.

TABLE 3

Effect of oil to water ratio on activation and reveal temperatures.

| Oil to water ratio | Activation temperature (° C.) | Reveal temperature (° C.) |
|---|---|---|
| 3:1 | −21 | −10 |
| 4:1 | −16.5 | −11.5 |

The Table indicates that the activation temperature decreases in inverse proportional relationship to increase of oil in the oil-to-water ratio and the reveal temperature increases in directly proportional relationship to increase of the oil in the oil-to-water ratio.

The activation temperature of emulsions has also been found to depend on the particle size in the oil phase of the emulsion, which size will depend on a range of other factors including the viscosity, the emulsifier content, and the oil-to-water ratio. In general, however, the activation temperature is directly proportional to the size of the oil particles in the oil phase.

Another factor which has been found to affect the activation and reveal temperatures of the emulsion is the type of emulsifier used. With the variables described above with reference to Tables 1 to 3 the activation and reveal temperatures are controlled by the variables described if the emulsifier remains in solution in the water phase until it freezes. This is the case for sodium alkyl ether sulphate and similar emulsifiers which remain soluble in water at very low temperatures.

However, if an emulsifier is used which precipitates when the water phase is cooled, the emulsion will collapse before either of the phases of the emulsion have become frozen. By selecting emulsifiers which are significantly more soluble in the water phase at higher temperature than at lower temperature control of an oil-in-water emulsion can be achieved so that activation and reveal temperatures are coincident.

In this case, the materials are selected so that the emulsifier becomes increasingly insoluble as the emulsion is cooled. When a specific temperature is achieved, the emulsifier precipitates and the emulsion becomes unstable. It immediately collapses, resulting in an obvious visual change. Since collapse of the emulsion occurs immediately upon precipitation of the emulsifier the arrangement is ideal for indicating that the material has been cooled below a specific temperature rather than indicating that it has been heated above a specific temperature.

The control can be enhanced by the addition of other materials to the water phase which are preferentially soluble. Such materials remain in solution when the emulsion is cooled while forcing the less soluble emulsifier out of solution. The temperature at which this occurs can be controlled by varying the quantity of emulsifier and the quantity of soluble additive.

Referring now to Table 4 below there is shown the relationship between the preferentially soluble additive (in this case salt) and the activation/reveal temperature. Samples were cooled to the stated temperature for 30 minutes.

TABLE 4

Effect of salt content on the activation and reveal temperature of materials which undergo visual change on cooling.

| Emulisifier content (pph) | Salt content (%) | Activation/reveal temperature (° C.) |
|---|---|---|
| 0.25 | 1.5 | −3.0 |
| 0.25 | 1.75 | −2.0 |
| 0.25 | 2.0 | −1.5 |
| 0.25 | 4.0 | 0.0 |

The Table indicates that for a given emulsifier content, the activation/reveal temperature increases in direct proportion to increase in concentration of the soluble additive.

It has been found that the activation and reveal temperatures of a material which undergoes an irreversible optical change on cooling is both time and temperature dependent. This is expected, given that the mechanism of operation is based on the precipitation of the emulsifier. For example, a material which changes immediately when cooled below −3° C. might take 30 minutes to change at −2° C. and several hours at −1° C. This time and temperature dependence can be useful since it allows the temperature sensitive material to be designed to match thermal change experienced by the product which the material is used to monitor.

It is possible therefore with the present invention to prepare temperature sensitive materials which respond to activation and reveal temperatures which are preselected by means of the above factors so as to suit a particular application. For example, an indicator for frozen food could be prepared so as to activate when the food is cooled below the normal food freezing temperature of −18° C. and to reveal when the food is subsequently heated above −12° C., the maximum legislated temperature of storage of most frozen foods. In the case of a freeze-sensitive pharmaceutical which, for example, may require storage above −2° C. a temperature sensitive material could be designed so as to activate when the pharmaceutical is cooled below −2° C. and reveal when the pharmaceutical is subsequently heated above 0° C.

However, applications of the invention are not confined to temperatures below 0° C. The invention provides for preparation of emulsions which will activate and reveal at temperatures above 0° C. by the selection of emulsions which precipitate at higher temperatures.

The visual change provided by the temperature sensitive material when it is exposed to the activation and reveal temperatures is usually a change from an opaque state to a transparent state. However, the material can be used to cover a coloured or patterned background so that the background is revealed when the temperature sensitive material becomes transparent.

Alternatively, or additionally, coloured dyes or pigments may be added to one or both of the phases of the emulsion. As a result, the emulsion will exhibit the combined colour of the two phases. When the emulsion is exposed to the activation and reveal temperatures, the two phases will separate and two distinct coloured areas will be visible. A further alternative is to make an emulsion with a particle size which is so small that the particles do not scatter light. In this case, the emulsion is initially transparent. When cooled to the activation and reveal temperatures, however, the emulsion particles will precipitate and the emulsion will undergo an irreversible optical change, usually becoming opaque. Emulsions with particle size below about 100 nm are suitable for displaying this effect.

The temperature sensitive material is usually in the form of a viscous liquid. For application as a temperature indicator, the liquid could be packaged in a variety of ways. These could include lamination between two polymer films, incorporation into rigid tubes or packages, microencapsulation, impregnation into foamed materials or emulsification into a solid polymer matrix. Suitable techniques for packaging the material are proposed in European patent application No. 94303514.7.

That which is claimed is:

1. A method for preparing an oil-in-water emulsion comprising the following steps:
    a) selecting the activation temperature for the emulsion;
    b) selecting the reveal temperature for the emulsion;
    c) selecting an oil phase depending on the preselected activation temperature;
    d) selecting an emulsifier that will remain in solution in aqueous phase above the freezing point of the aqueous phase;
    e) preparing an oil-in-water emulsion;
    f) controlling the concentration of the emulsifier in the emulsion to adjust the activation temperature of the emulsion;
    g) controlling the particle size of the oil phase in the emulsion thereby adjusting the activation temperature in direct proportion to the size of the oil particles in the oil phase,
    h) controlling the oil-to-water ratio in the emulsion and thereby adjusting the activation and reveal temperatures, wherein the activation temperature decreases in inverse proportion to increasing the oil in the oil-to-water ratio, and wherein the reveal temperature increases in direct proportion to increasing the oil in the oil-to-water ratio;
    i) controlling the freezing point of the aqueous phase to adjust the reveal temperature of the emulsion; and
    j) controlling the freezing point of the oil phase, wherein when the freezing point of the oil phase is less than the freezing point of the aqueous phase, then the activation temperature is determined by the freezing point of the oil phase, whereby the emulsion is characterized by the preselected activation and reveal temperatures.

2. The method of claim 1 wherein in the step (f) of controlling the concentration of the emulsifier in the emulsion to adjust the activation temperature of the emulsion, the activation temperature is inversely proportional to the concentration of the emulsifier.

3. The method of claim 1 wherein the step (i) of controlling the freezing point of the aqueous phase to adjust the reveal temperature of the emulsion is accomplished by adding freezing point depressant to the aqueous phase, wherein increasing the concentration of freezing point depressant reduces the reveal temperature.

4. The method of claim 3 wherein the freezing point depressant is selected from the group consisting of salt, glycerol, and urea.

5. The method of claim 1 wherein the freezing point of the oil phase is greater than the freezing point of the aqueous phase.

6. The method of claim 1 wherein the emulsifier is sodium alkyl ether sulfate.

7. A method for preparing an oil-in-water emulsion comprising the following steps:
    a) selecting coincident activation and reveal temperatures for the emulsion;
    b) selecting an oil phase for the emulsion;
    c) selecting an emulsifier that precipitates upon cooling of the emulsion and above the freezing point of the aqueous phase, whereby the activation and reveal temperatures are coincident;
    d) controlling the solubility of the emulsifier above the freezing point of the aqueous phase, thereby to adjust the coincident activation and reveal temperatures; and
    e) preparing an oil-in-water emulsion, whereby the emulsion is characterized by the preselected coincident activation and reveal temperatures.

8. The method of claim 7 wherein the step (d) of controlling the solubility of the emulsifier above the freezing point of the aqueous phase, thereby to adjust the coincident activation and reveal temperatures, is accomplished by adjusting the concentration of the emulsifier in the emulsion and by incorporating one or more additives that are preferentially soluble to the emulsifier.

9. The method of claim 8 wherein the step of increasing the concentration of the preferentially soluble additive increases the coincident activation and reveal temperatures in direct proportion to the concentration of the preferentially soluble additive for a given emulsifier concentration.

10. The method of claim 7 wherein the emulsion undergoes an irreversible optical change when cooled below the coincident activation and reveal temperatures.

* * * * *